United States Patent
Elsherif et al.

(10) Patent No.: US 10,135,504 B2
(45) Date of Patent: Nov. 20, 2018

(54) TECHNIQUES FOR MU-MIMO SOUNDING SEQUENCE PROTECTION

(71) Applicant: QUALCOMM Incorporated, San Diego, CA (US)

(72) Inventors: Ahmed Ragab Elsherif, San Jose, CA (US); Nathaniel David Houghton, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/294,473

(22) Filed: Oct. 14, 2016

(65) Prior Publication Data

US 2018/0109298 A1 Apr. 19, 2018

(51) Int. Cl.
*H04B 7/04* (2017.01)
*H04B 7/0452* (2017.01)
*H04L 5/00* (2006.01)
*H04W 74/08* (2009.01)
*H04W 84/12* (2009.01)

(52) U.S. Cl.
CPC ......... *H04B 7/0452* (2013.01); *H04L 5/0048* (2013.01); *H04W 74/0816* (2013.01); *H04W 84/12* (2013.01)

(58) Field of Classification Search
CPC .............................. H04B 7/0452; H04L 5/0048
See application file for complete search history.

(56) References Cited

U.S. PATENT DOCUMENTS

| 8,842,606 | B2 | 9/2014 | Denteneer et al. | |
|---|---|---|---|---|
| 8,989,161 | B2 | 3/2015 | Kim et al. | |
| 8,995,564 | B2 | 3/2015 | Liu et al. | |
| 9,137,815 | B2 | 9/2015 | Sampath et al. | |
| 2007/0298742 | A1* | 12/2007 | Ketchum | H04B 7/0617 455/186.1 |
| 2010/0322166 | A1* | 12/2010 | Sampath | H04W 72/121 370/329 |
| 2011/0122805 | A1* | 5/2011 | Abraham | H04W 72/1215 370/312 |
| 2011/0205968 | A1* | 8/2011 | Kim | H04W 72/085 370/328 |

(Continued)

OTHER PUBLICATIONS

International Search Report and Written Opinion—PCT/US2017/049857—ISA/EPO—dated Nov. 15, 2017. (14 total pages).

*Primary Examiner* — Kenneth Lam
(74) *Attorney, Agent, or Firm* — Steven R. Thiel; Arent Fox (57) ABSTRACT

The disclosure provides techniques for sounding sequence protection in multi-user multiple-input-multiple-output (MU-MIMO) communications for wireless local area networks (WLANs). An access point (AP) may select a station (STA) from multiple STAs in a MU-MIMO group. The AP may then transmit a request-to-send (RTS) frame, where the RTS is addressed to the selected STA. The AP may receive a clear-to-send (CTS) frame from the selected station and may perform, in response to receiving the CTS frame, a sounding sequence with the MU-MIMO group. After completion of the sounding sequence, the AP may transmit MU-MIMO data communications to at least one of the STAs in the MU-MIMO group.

31 Claims, 7 Drawing Sheets

(56) References Cited

U.S. PATENT DOCUMENTS

| | | | |
|---|---|---|---|
| 2011/0261708 A1* | 10/2011 | Grandhi | H04W 4/06 370/252 |
| 2012/0099664 A1* | 4/2012 | Cheong | H04W 74/085 375/259 |
| 2012/0236840 A1* | 9/2012 | Kim | H04B 7/0452 370/338 |
| 2012/0263091 A1* | 10/2012 | Kim | H04B 7/0452 370/312 |
| 2014/0079010 A1* | 3/2014 | Li | H04B 7/0617 370/329 |
| 2015/0365972 A1* | 12/2015 | Seok | H04W 74/0816 370/336 |
| 2015/0372795 A1* | 12/2015 | Wu | H04L 5/0057 370/329 |
| 2016/0197655 A1* | 7/2016 | Lee | H04B 7/024 370/338 |
| 2016/0254884 A1* | 9/2016 | Hedayat | H04B 7/0413 370/329 |
| 2016/0330732 A1* | 11/2016 | Moon | H04B 7/0617 |
| 2017/0006616 A1* | 1/2017 | Singh | H04W 74/0808 |
| 2017/0033898 A1* | 2/2017 | Chun | H04W 84/12 |
| 2017/0070914 A1* | 3/2017 | Chun | H04L 1/0026 |

* cited by examiner

TECHNIQUES FOR MU-MIMO SOUNDING SEQUENCE PROTECTION

BACKGROUND

Aspects of this disclosure relate generally to telecommunications, and more particularly to techniques for sounding sequence protection in multi-user multiple-input-multiple-output (MU-MIMO) communications for wireless local area networks (WLANs).

The deployment of WLANs in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). Nearby BSSs may have overlapping coverage areas and such BSSs may be referred to as overlapping BSSs or OBSSs. In some scenarios, communications that occur in nearby BSSs can result in collisions and failure in the transmission of information.

In dense enterprise deployments of WLANs, such as in stadiums, airports, or other large venues, for example, there may be multiple APs deployed, and the coverage of several of those APs can overlap creating OBSS scenarios. For example, in these dense deployments, multiple STAs can be in the common coverage of multiple BSSs. Moreover, when these dense deployments are unplanned, some of the APs may be automatically configured to work on the same channel, which may cause transmission collisions between OBSSs. The collisions that occur may result in sounding sequence failures and, upon detection of a sounding sequence failure, an AP may terminate a transmission opportunity (TxOP) and would need to contend for the medium again. System throughput can be severely impacted if this happens frequently.

For MU-MIMO transmissions, however, the WLAN standards (e.g., IEEE 802.11-based standards) have not defined a specific mechanism that may be used for MU-MIMO sounding sequence protection. One option for MU PLCP Protocol Data Unit (PPDU) protection is to send multiple RTSs one by one to all of the STAs that will be part of the subsequent MU PPDU transmission and expect a CTS from each of those STAs. However, this solution may not be practical for MU-MIMO sounding sequence protection because it incurs a large overhead that may not be needed in non-OBSS scenarios.

Accordingly, for scenarios that create OBSSs between nearby BSSs and that can result in sounding sequence collisions and failures, it may be desirable to have a mechanism that protects the sounding sequence while providing low overhead.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, methods, apparatus, and computer-readable medium relate to techniques for sounding sequence protection in MU-MIMO communications for WLANs. An AP may select an STA from multiple STAs in a MU-MIMO group. The AP may then transmit a request-to-send (RTS) frame, where the RTS is addressed to the selected STA. The AP may receive a clear-to-send (CTS) frame from the selected station and may perform, in response to receiving the CTS frame, a sounding sequence with the MU-MIMO group. After completion of the sounding sequence, the AP may transmit MU-MIMO communications to at least one of the STAs in the MU-MIMO group. By using an RTS-CTS sequence before the sounding sequence, the AP may protect the sounding sequence from collisions that may result in a sounding sequence failure. Moreover, the techniques described herein perform the sounding sequence protection with a more efficient overhead scheme than that provided by other protection mechanisms.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

In dense enterprise deployments of WLANs, such as in stadiums, airports, or other large venues, there may be multiple APs deployed, and the coverage of several of those APs can overlap creating OBSS scenarios. In these dense deployments, multiple STAs can be in the common coverage of multiple BSSs. Moreover, when these dense deployments are unplanned, some of the APs may be automatically configured to work on the same channel, which may cause collisions between OBSSs.

For single user (SU) transmissions in WLAN, the request-to-send/clear-to-send (RTS-CTS) sequence has been defined to solve the hidden node problem. The RTS-CTS sequence typically involves the sending of an RTS frame and the receiving of a CTS frame in response to the RTS frame. The RTS-CTS sequence may therefore be used to protect (e.g., avoid collisions or interference) a sounding sequence from hidden nodes. A sounding sequence may refer to a sequence of messages or information used to generate beam-forming based on explicit knowledge of the forward channel that is being used. The beam-forming may then be used to more effectively communicate by adapting the signal transmission using multiple antennas. The sounding sequence involves the transmission of a null data or no data packet announcement (NDPA) before an NDP to obtain feedback information needed for beam-forming (typically one NDPA and one NDP are sent per sounding sequence). The sounding sequence may also involve the transmission of compressed beam-forming feedback (CBF) and/or beam-forming report poll (BRPoll). Using an RTS-CTS sequence in single user transmissions may protect the sounding sequence from the type of collisions (e.g., interference) that would otherwise result in sounding sequence failure.

MU-MIMO communications are typically provided to multiple STAs, where an AP may transmit to a full set of STAs that have participated in a sounding sequence or to a subset of the STAs that participated in the sounding sequence (an AP may still chose to transmit to a single STA after a MU-MIMO sounding sequence). For MU-MIMO transmissions, however, the WLAN standards up to IEEE 802.11ac have not defined a specific mechanism that may be used for MU-MIMO sounding sequence protection. One option for MU PLCP Protocol Data Unit (PPDU) protection is to send multiple RTS frames one by one to all of STAs that will be part of the subsequent MU PPDU transmission and expect a CTS frame from each of STAs. However, this solution may not be practical for MU-MIMO sounding sequence protection because it incurs a large overhead that may not be needed in non-OBSS scenarios.

Other proposed solutions, such as the use of a MU-RTS frame (a MAC frame), employ frames that are different from ordinary RTS frames as those frames are configured to have multiple recipient MAC addresses. These modified MAC frames are therefore different from ordinary MAC RTS frames. This approach not only lacks backwards compatibility with STAs that support ordinary RTS frames with a single MAC address, but may also cause a decoding issue as CTS frames from each of the STAs addressed by the MU-RTS frame are sent back at the same time. For example, legacy STAs such as non-IEEE 802.11ax STAs (e.g., IEEE 802.11a, g, n, and ac STAs) may not understand the MAC content of the MU-RTS frame and would therefore not send a CTS frame sing the MU-RTS frame was not recognized or understood to be an RTS frame. Nevertheless, the legacy STAs will defer for the duration of the MU-RTS frame. On the other hand, non-legacy STAs (e.g., IEEE 802.11ax STAs) will recognize and understand the MU-RTS frame but will all reply at the same time causing the decoding issues described above. Another proposed solution may also employ frames that are different from ordinary RTS frames by using a group identifier (ID) or a group sequence number to identify multiple STAs to be addressed. This approach, like the one described earlier, also lacks backwards compatibility and has the same issue of decoding multiple CTS frames that are sent back at the same time.

For MU-MIMO transmissions in OBSS scenarios like the ones described above, not protecting the MU-MIMO sounding sequence may result in collision of the sounding sequence and in a sounding sequence failure. Upon the detection of sounding failure (i.e., no CBF received after the NDP), the AP will terminate the transmission opportunity (TxOP) and will have to contend for the medium again. Since the TxOP is lost on sounding sequence failure, the system throughput can be severely impacted if this happens frequently, which can be the case in the OBSS scenarios described above. Typically, upon detection of a sounding sequence failure, and after random backoff (RBO), the AP will either retry the sounding sequence and the MU-MIMO transmission, or will try a new set of MU-MIMO STAs. Again, either of these operations results in reduced system throughput. Accordingly, it is desirable to develop effective ways to protect MU-MIMO sounding sequence in OBSS scenarios.

Various techniques are proposed in which an ordinary, single user RTS-CTS sequence is exchanged with one of the STAs intended for the upcoming MU-MIMO transmission before the MU-MIMO sounding sequence takes place in order to protect the MU-MIMO sounding sequence. The RTS frame used in the RTS-CTS sequence can be an ordinary RTS frame as supported by the IEEE 802.11 standards. This scheme provides MU-MIMO sounding sequence protection with the overhead of only one RTS-CTS sequence (i.e., similar to regular RTS-CTS sequences used for SU transmissions) and avoids the larger overhead used in, for example, MU PPDU protection. Moreover, this approach also overcomes the backward compatibility issues of other proposals and does not run into the decoding problem of receiving multiple CTS frames back at the same time. In this approach, the RTS-CTS sequence may be sent to one or more (e.g., a subset) of the STAs that participate in the sounding sequence (e.g., a subset of the STAs announced in the NDPA frame). Therefore, aspects of this approach described in connection with one intended STA may be expanded to include multiple intended STAs.

The intended STA for the RTS-CTS sequence (e.g., the STA selected for the RTS-CTS sequence) may be chosen randomly out of the STAs for the upcoming MU-MIMO transmission (e.g., the MU-MIMO group), as the first STA in the sounding sequence (i.e., the one that will send back the CBF immediately in response to the NDP), in a round-robin fashion, or in a token-based scheduling fashion. In one aspect, a token can be assigned to each of the STAs and decremented for the STA used for the RTS-CTS sequence. In another aspect, the token(s) may be distributed based on which STAs in the MU-MIMO sounding sequence have the most sounding sequence failures.

As part of the protection of the MU-MIMO sounding sequence using an RTS-CTS sequence, the RTS frame may have a corresponding duration that may cover the duration of the CTS, the NDPA, and the NDP; while the intended STA is to respond with a CTS frame that may have a corresponding duration that may cover the duration of the NDPA and NDP. In another aspect, the RTS frame duration may cover the CTS and duration of the complete MU-MIMO sounding sequence (e.g., CTS-NDPA-NDP-CBF1-BRPoll-CBF2-BRPoll-CBF3- . . . ); while the intended STA is to respond with a CTS duration that covers the duration of the complete MU-MIMO sounding sequence (e.g., NDPA-NDP-CBF1-BRPoll-CBF2-BRPoll-CBF3- . . . ). That is, the network allocation vector (NAV) duration of a CTS frame is set to the NAV duration of the preceding RTS frame minus the duration of the preceding RTS frame minus a short interframe space (SIFS) duration.

In yet another aspect, the RTS frame duration may cover the CTS frame, the duration of the complete MU-MIMO sounding sequence, and the duration of the complete subsequent MU PPDU transmission; while the intended STA is to respond with a CTS frame duration that covers the duration of the complete MU-MIMO sounding sequence plus the duration of the complete subsequent MU PPDU transmission.

The various approaches described herein may protect the MU-MIMO sounding sequence from OBSS APs. One of the reasons to protect MU-MIMO sounding sequences is that collisions in the RTS-CTS sequence have less of an impact on overall throughput than collisions in the MU-MIMO sounding sequence. As such, it may be preferable to reduce the number of collisions in the MU-MIMO sounding sequence than to reduce the number of collisions in the RTS-CTS sequence in order to improve the overall throughput.

Moreover, the various techniques of using an RTS-CTS sequence for MU-MIMO sounding sequence protection need not be enabled at all times. Triggering of this scheme may happen in different ways: manually in OBSS scenarios (e.g., through a register setting), when an OBSS is detected, periodically to see if using the scheme enhances throughput, or in response to detecting a certain number or threshold of MU-MIMO sounding sequence failures over a specified period of time. For example, if 50 or so sounding collisions (e.g., sounding sequence failures) are detected over a 1 second time period, the use of RTS-CTS sequence protection may be triggered.

The various techniques described may be adapted to dynamically increase (or decrease) the number of STAs to which to send RTS as part of the MU-MIMO sounding sequence protection. The increase in protection that comes from using more STAs also comes with more overhead and less MAC level efficiency. The number of STAs used may be based on packet error rate (PER) and/or channel collision statistics. In environments with more interference, two or more STAs (but generally less than the whole number of STAs in the MU-MIMO group) may be sent an RTS frame, while in environments with less interference, an RTS frame may be sent to a single STA, or to no STA at all.

Aspects of the protection of MU-MIMO sounding sequence in WLANs described above are provided in more detail in the following description and related drawings directed to specific disclosed aspects. The present methods and apparatuses may provide an efficient solution, as compared to current proposals, as described above. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
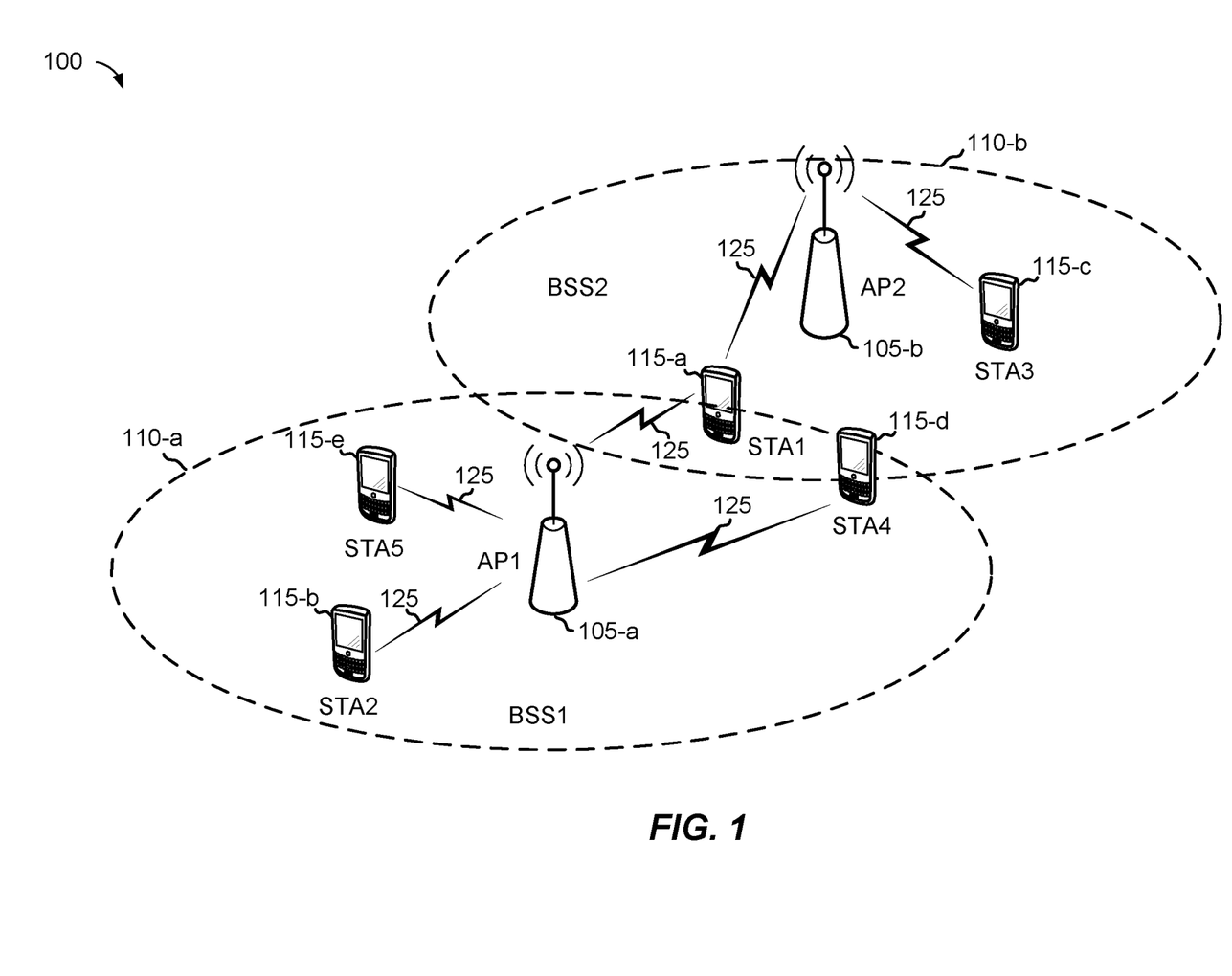
FIG. 1 is a conceptual diagram illustrating an example of a wireless local area network (WLAN) deployment.

FIG. 1 is a wireless communication system 100 illustrating an example of a wireless local area network (WLAN) deployment in connection with various techniques described herein. The WLAN deployment may include one or more access points (APs) and one or more wireless stations (STAs) associated with a respective AP. In this example, there are only two APs deployed for illustrative purposes: AP1 105-*a* in basic service set 1 (BSS1) and AP2 105-*b* in BSS2. AP1 105-*a* is shown having at least two associated STAs (STA1 115-*a*, STA2 115-*b*, STA4 115-*d*, and STA5 115-*e*) and coverage area 110-*a*, while AP2 105-*b* is shown having at least two associated STAs (STA1 115-*a* and STA3 115-*c*) and coverage area 110-*b*. In the example of FIG. 1, the coverage area of AP1 105-*a* overlaps part of the coverage area of AP2 105-*b* such that STA1 115-*a* is within the overlapping portion of the coverage areas. The number of BSSs, APs, and STAs, and the coverage areas of the APs described in connection with the WLAN deployment of FIG. 1 are provided by way of illustration and not of limitation. Moreover, aspects of the various techniques described herein are at least partially based on the example WLAN deployment of FIG. 1 but need not be so limited.

The APs (e.g., AP1 105-*a* and AP2 105-*b*) shown in FIG. 1 are generally fixed terminals that provide backhaul services to STAs within its coverage area or region. In some applications, however, the AP may be a mobile or non-fixed terminal. The STAs (e.g., STA1 115-*a*, STA2 115-*b*, STA3 115-*c*, STA4 115-*d*, and STA5 115-*e*) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, a small cell, or any other suitable terminology. The various concepts described throughout this disclosure are intended to apply to all suitable wireless apparatus regardless of their specific nomenclature.

Each of STA1 115-a, STA2 115-b, STA3 115-c, STA4 115-d, and STA5 115-e may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-a and AP2 105-b can include software applications and/or circuitry to enable associated STAs to connect to a network via communications links 125. The APs can send frames to their respective STAs and receive frames from their respective STAs to communicate data and/or control information (e.g., signaling).

Each of AP1 105-a and AP2 105-b can establish a communications link 125 with an STA that is within the coverage area of the AP. Communications links 125 can comprise communications channels that can enable both uplink and downlink communications. When connecting to an AP, an STA can first authenticate itself with the AP and then associate itself with the AP. Once associated, a communications link 125 can be established between the AP and the STA such that the AP and the associated STA can exchange frames or messages through a direct communications channel.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for scheduling and grouping users or STAs for data transmission over an OFDMA frame may be applicable to any suitable wireless network regardless of the coverage range and the wireless access protocols utilized.

In an aspect, an AP, such as AP1 105-a may communicate with multiple STAs, such as STAs 115-a, 115-b, 115-d, and 115-e using MU-MIMO. Such a group may be referred to as a MU-MIMO group. The proximity of AP2 105-b (BSS2) to BSS1 may create an OBSS scenario like the ones described above. In such scenario, the MU-MIMO sounding sequence used by AP1 105-a in connection with an MU-MIMO group may have collisions or interference from AP2 105-b in BSS2. These collisions may result in sounding sequence failures and can significantly impact system throughput. To overcome the possible effects from interference by AP2 105-b in BSS2, AP1 105-a may perform the various techniques described herein to protect the MU-MIMO sounding sequence using ordinary RTS frames in an RTS-CTS sequence. Additional details as to the operation of AP1 105-a are provided below in connection with FIGS. 2-6.

Figure 2:
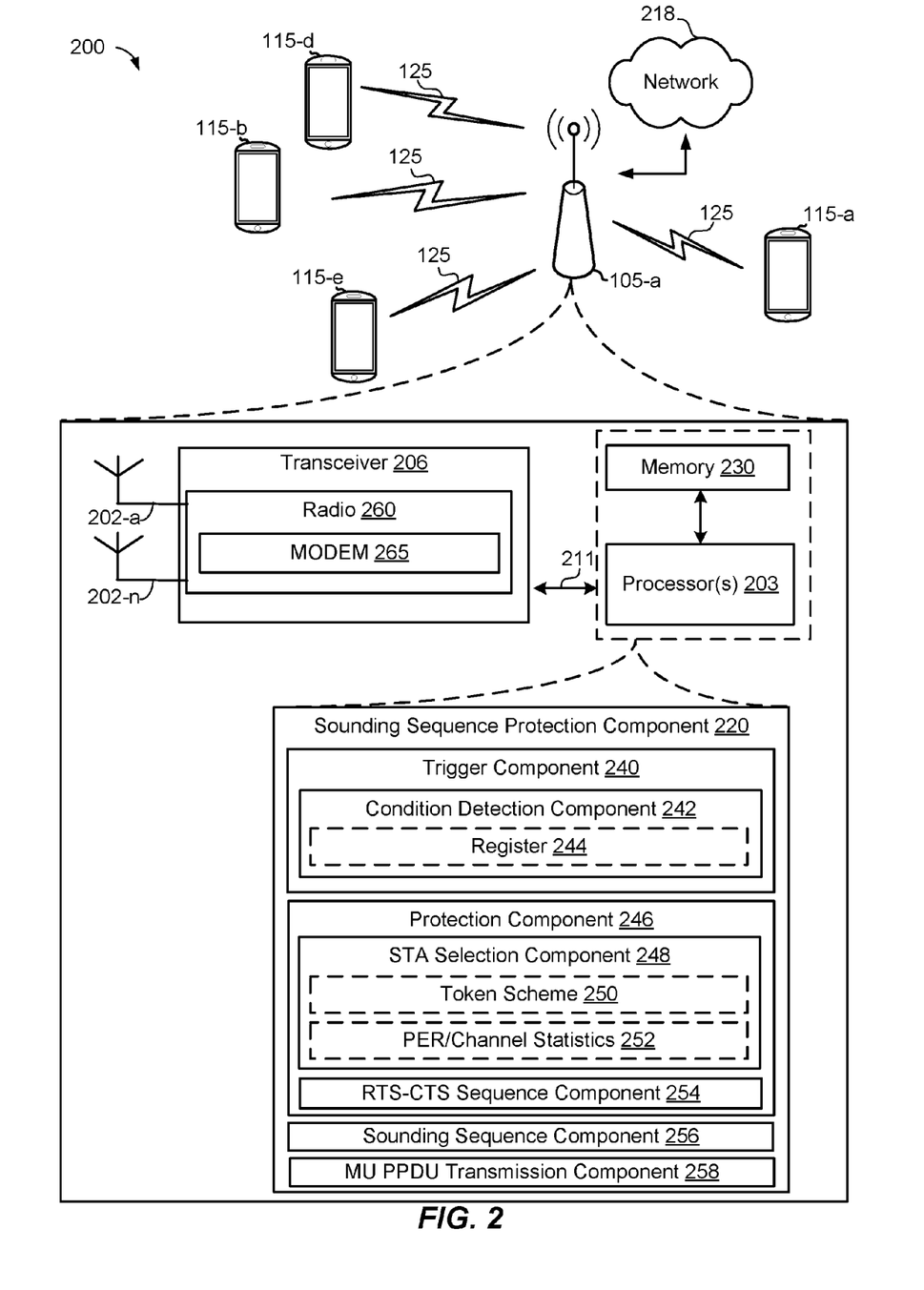
FIG. 2 is a schematic diagram of a communication network including aspects of an access point in a WLAN in accordance with various aspects of the present disclosure.

Referring to FIG. 2, in an aspect, a wireless communication system 200 includes STAs 115-a, 115-b, 115-d, and 115-e in wireless communication with at least one AP, such as AP1 105-a connected to network 218, similar to STAs 115-a, 115-b, 115-d, and 115-e, and AP1 105-a of FIG. 1. The STAs 115-a, 115-b, 115-d, and 115-e may communicate with network 218 via AP1 105-a. In an example, STAs 115-a, 115-b, 115-d, and 115-e may transmit and/or receive wireless communication to and/or from AP1 105-a via one or more communication links 125. Such wireless communications may include, but are not limited to, data, audio and/or video information. In some instances, such wireless communications may include control or similar information. In an aspect, an AP, such as AP1 105-a may be configured to perform an MU-MIMO sounding sequence for an MU-MIMO group including multiple STAs, such as STAs 115-a, 115-b, 115-d, and 115-e. In OBSS scenarios, the AP1 105-a may perform techniques to protect the MU-MIMO sounding sequence from interference by nearby APs to reduce the number of sounding sequence failures and improve system throughput.

In accordance with the present disclosure, AP1 105-a may include a memory 230, one or more processors 203 and a transceiver 206. The memory, one or more processors 203 and the transceiver 206 may communicate internally via a bus 211. In some examples, the memory 230 and the one or more processors 203 may be part of the same hardware component (e.g., may be part of a same board, module, or integrated circuit). Alternatively, the memory 230 and the one or more processors 203 may be separate components that may act in conjunction with one another. In some aspects, the bus 211 may be a communication system that transfers data between multiple components and subcomponents of the AP1 105-a. In some examples, the one or more processors 203 may include any one or combination of modem processor, baseband processor, digital signal processor, and/or transmit processor. Additionally or alternatively, the one or more processors 203 may include a sounding sequence protection component 220 for carrying out one or more methods or procedures described herein. The sounding sequence protection component 220 may comprise hardware, firmware, and/or software and may be configured to execute code or perform instructions stored in a memory (e.g., a computer-readable storage medium).

In some examples, the AP1 105-a may include the memory 230, such as for storing data used herein and/or local versions of applications or sounding sequence protection component 220 and/or one or more of its subcomponents being executed by the one or more processors 203. Memory 230 can include any type of computer-readable medium usable by a computer or processor 203, such as random access memory (RAM), read only memory (ROM), tapes, magnetic discs, optical discs, volatile memory, non-volatile memory, and any combination thereof. In an aspect, for example, memory 230 may be a computer-readable storage medium (e.g., a non-transitory medium) that stores computer-executable code. The computer-executable code may define one or more operations or functions of sounding sequence protection component 220 and/or one or more of its subcomponents, and/or data associated therewith. The computer-executable code may define these one or more operations or functions when AP1 105-a is operating processor 203 to execute sounding sequence protection component 220 and/or one or more of its subcomponents. In some examples, the AP1 105-*a* may further include a transceiver 206 for transmitting and/or receiving one or more data and control signals to/from an STA, such as 115-*a*, 115-*b*, 115-*d*, and 115-*e*. The transceiver 206 may comprise hardware, firmware, and/or software and may be configured to execute code or perform instructions stored in a memory (e.g., a computer-readable storage medium). The transceiver 206 may include multiple radios and modems including radio 260 comprising a modem 265. In an aspect, AP1 105-*a* and transceiver 206 supports MU-MIMO that enables multiple wireless connections such as a wireless local area network (WLAN) or a short distance communication protocol (e.g., Bluetooth radio) with a plurality of STAs, such as STAs 115-*a*, 115-*b*, 115-*d*, and 115-*e*. The radio 260 may utilize one or more antennas 202 (e.g., antennas 202-*a*, . . . , 202-*n*) for transmitting signals to and receiving signals from a plurality of STAs, such as STAs 115-*a*, 115-*b*, 115-*d*, and 115-*e*. The signals transmitted and/or received may include frames or other messages and information used in RTS-CTS sequences and MU-MIMO sounding sequences. The transceiver 206 may include a receiver and a transmitter, which may be part of the radio 260 and/or part of the modem 265. The receiver may include one or more components that form a receiving chain and the transmitter may include one or more components that form a transmitting chain.

In an aspect, AP1 105-*a* may include the sounding sequence protection component 220 having a trigger component 240 that is configured to trigger the use of MU-MIMO sounding sequence protection. For example, the trigger component 240 may be configured to detect a condition associated with OBSS scenarios that are likely to result in sounding sequence failures because of collisions or interference. As such, the trigger component may include a condition detection component 242 that may carry out such detection. The detection may be based on a register setting (e.g., setting optional register 244) that indicates that the AP1 105-*a* is to operate in an OBSS scenario. This register setting may have been set manually based on the type of deployment of the AP1 105-*a*. The detection may also be based on detecting an OBSS scenario based on, for example, receiving an OBSS frame. The detection may also be based on having a periodic, regular, scheduled, or otherwise predetermined period of time during which RTS-CTS sequence protection for MU-MIMO sounding sequence is applied to determine whether such protection provides an improvement in system throughput (e.g., PER or collision statistics). If an improvement in system throughput is noticed or determined to occur using the scheduled RTS-CTS sequence (e.g., improvement satisfies a threshold), then RTS-CTS sequence protection is continued to be applied for a predetermined period of time. If an improvement in system throughput is not noticed or determined to occur (e.g., improvement does not satisfy a threshold or there is no improvement in system throughout), then RTS-CTS sequence protection is discontinued until the next scheduled time.

In another aspect, sounding sequence protection component 220 may include a protection component 246 configured to perform MU-MIMO sounding sequence protection in the appropriate scenarios (e.g., when an OBSS condition is detected and protection is triggered). For example, the operation of the protection component 246 may be triggered by the trigger component 240 in response to the detection of an OBSS scenario condition as described above. The protection component 246 may include an STA selection component 248 that is configured to select one or more STAs as intended STAs for RTS frames as part of the RTS-CTS sequence for protection of the MU-MIMO sounding sequence.

In a first proposed solution that involves RTS-CTS sequence protection, the STA selection component 248 may select a single STA from an MU-MIMO group as the intended STA for receiving an ordinary RTS frame. By sending the RTS to only one STA, the RTS-CTS overhead may be reduced while giving a high probability of protecting the MU-MIMO sounding sequence, particularly when most STAs are in the common coverage of multiple BSSs.

The selection of the single STA may be performed using different criteria. For example, the intended STA for the RTS-CTS sequence (e.g., the STA selected for the RTS-CTS sequence) may be chosen randomly out of the STAs for the upcoming MU-MIMO transmission (e.g., the MU-MIMO group), as the first STA in the sounding sequence (i.e., the one that will send back the CBF immediately in response to the NDP), in a round-robin fashion, or in a token-based scheduling fashion using an optional token scheme 250. In one aspect, a token can be assigned to each of the STAs and decremented for the STA used for the RTS-CTS sequence. In another aspect, the token(s) may be distributed based on which STAs in the MU-MIMO sounding sequence have the most sounding sequence failures. The sounding sequence failures considered may be failures due to collisions at the AP1 105-*a* (e.g., collisions sending NDPA or NDP) or due to collisions at an STA (e.g., collisions sending feedback from the STA).

In a second proposed solution, the STA selection component 248 may select more than one STA from an MU-MIMO group (e.g., typically fewer than the total number of STAs in the MU-MIMO group) as the intended STAs for receiving an ordinary RTS frame. That is, a subset of the STAs in a MU-MIMO group may be selected as intended STAs. The more STAs to which an RTS frame is sent the higher the probability of MU-MIMO sounding sequence protection; however, this solution increases the overhead and reduces the MAC efficiency. The selection criteria for determining which STAs are the intended STAs may be similar to the selection criteria described above for a single STA selection. When selecting multiple STAs there may be a need to rank or otherwise order the STAs to make the selection.

In the second proposed solution, the number of STAs selected may depend on the level of interference. In an aspect, the STA selection component 248 may be configured to consider packet error rate (PER) and collision statistics 252 to determine how many STAs to be used as part of the MU-MIMO sounding sequence protection. For example, when PER/collision statistics 252 identify an environment with high levels of interference (e.g., interference levels satisfy a threshold), a greater number of STAs may be selected to be sent an RTS frame. On the other hand, when PER/collision statistics 252 identify an environment with low levels of interference (e.g., interference levels do not satisfy a threshold), a smaller number of STAs may be selected to be sent an RTS frame. In this last scenario, the STA selection component 248 may determine that a single STA (e.g., first proposed solution) or no STA may be sent an RTS frame. Accordingly, the STA selection component 248 may be configured to dynamically adapt the number of STAs used in RTS-CTS sequence protection of the MU-MIMO sounding sequence. As such, the STA selection component 248 may increase or decrease the number of STAs over time.

The protection component 246 may also include an RTS-CTS sequence component 254 configure to generate and send RTS frames, and receive and process CTS frames, in accordance with the techniques described in this disclosure. The RTS-CTS sequence component 254 may therefore perform an exchange of RTS and CTS frames with one or more STAs based on which STAs are selected by the STA selection component 248.

For the RTS-CTS sequence, the RTS frame generated by the RTS-CTS sequence component 254 may have a corresponding duration that may cover the duration of the CTS frame, the NDPA, and the NDP; while the intended STA is to respond with a CTS frame that may have a corresponding duration that may cover the duration of the NDPA and NDP. In another aspect, the RTS frame generated by the RTS-CTS sequence component 254 may have a duration that may cover the duration of the CTS frame and the duration of the complete MU-MIMO sounding sequence (e.g., CTS-NDPA-NDP-CBF1-BRPoll-CBF2-BRPoll-CBF3- . . . ); while the intended STA is to respond with a CTS frame that has a duration that covers the duration of the complete MU-MIMO sounding sequence (e.g., NDPA-NDP-CBF1-BR-Poll-CBF2-BRPoll-CBF3- . . . ).

In yet another aspect, the RTS frame duration may cover the CTS frame, the duration of the complete MU-MIMO sounding sequence, and the duration of the complete subsequent MU PPDU transmission; while the intended STA is to respond with a CTS frame duration that covers the duration of the complete MU-MIMO sounding sequence plus the duration of the complete subsequent MU PPDU transmission The sounding sequence protection component 220 may also include a sounding sequence component 256 that is configured to perform MU-MIMO sounding sequence in connection with the RTS-CTS sequence protection provided by the protection component 246 in OBSS scenarios. For example, the sounding sequence component 256 may generate and send NDPA and NDP to STAs in an MU-MIMO group, and may receive and process CBF from one or more of the STAs in the MU-MIMO group. The sounding sequence component 256 may also generate and send BRPoll, similar to generating and sending NDPA and NDP. With the information provided by the MU-MIMO sounding sequence, the AP1 105-a may configure the transmission of MU-MIMO data over the multiple antennas 202-a, . . . , 202-n. For example, the sounding sequence protection component 220 may also include an MU PPDU transmission component 258 configured to perform data transmission of MU-MIMO data (e.g., PPDUs) over multiple antennas. The MU PPDU transmission component 258 may operate in connection with the transceiver 206. For example, the MU PPDU transmission component 258 may transmit MU-MIMO data using a transmitter in the transceiver 206.

Figure 3A:
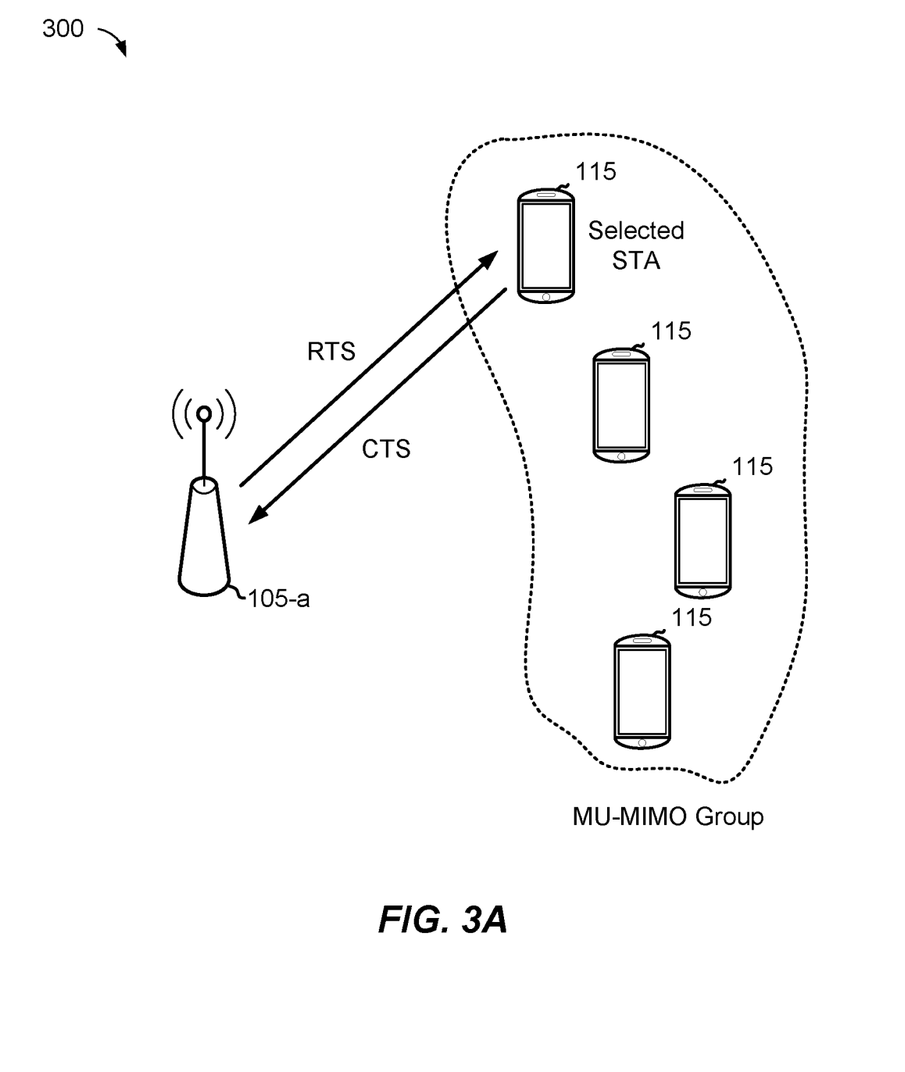
FIG. 3A is a diagram illustrating MU-MIMO sounding sequence protection using a single RTS-CTS sequence for a selected wireless station of an MU-MIMO group in accordance with various aspects of the present disclosure.

FIG. 3A illustrates a diagram 300 showing an example of the first proposed solution in which MU-MIMO sounding sequence protection uses a single RTS-CTS sequence for a selected STA of an MU-MIMO group. In this example, the AP1 105-a has detected a condition (e.g., OBSS scenario) for which MU-MIMO sounding sequence protection is needed. The AP1 105-a identifies or selects a single STA from the respective MU-MIMO group and performs an RTS-CTS sequence with that STA. After hearing the CTS, other STAs and OBSS APs would set their network allocation vector (NAV) for the appropriate duration of the MU-MIMO sounding sequence. After the RTS-CTS sequence, the MU-MIMO sounding sequence is performed with the MU-MIMO group to subsequently transmit MU-MIMO data transmission to the STAs in the MU-MIMO group. The MU-MIMO sounding sequence is protected because of the NAV setting in the other STAs and OBSS APs.

Figure 3B:
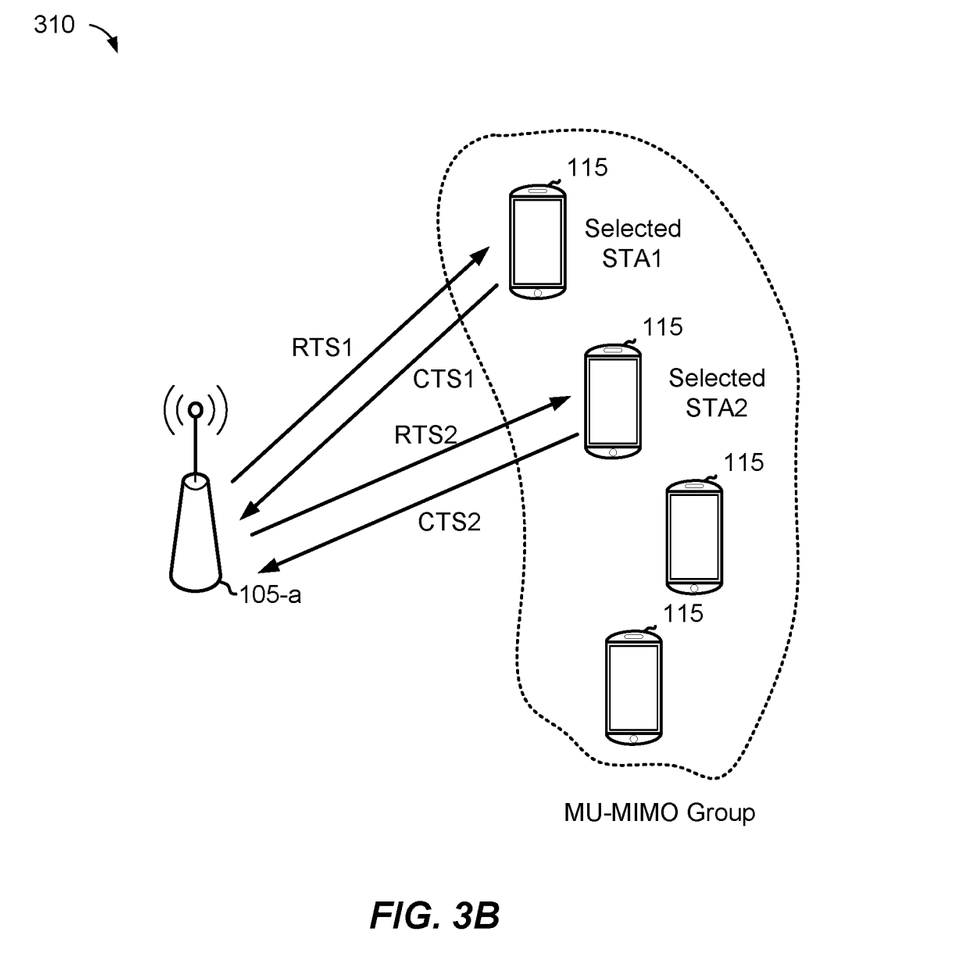
FIG. 3B is a diagram illustrating MU-MIMO sounding sequence protection using multiple RTS-CTS sequences for selected wireless stations of an MU-MIMO group in accordance with various aspects of the present disclosure.

FIG. 3B is a diagram 310 showing an example of the second proposed solution in which MU-MIMO sounding sequence protection uses multiple RTS-CTS sequences for selected STAs (e.g., STA1 and STA2 in FIG. 3B) of an MU-MIMO group. In this example, the AP1 105-a has detected a condition (e.g., OBSS scenario) for which MU-MIMO sounding sequence protection is needed. AP1 105-a also determines that the level of interference is such that more than one STA needs to be used for MU-MIMO sounding sequence protection. The AP1 105-a then identifies or select two or more STAs from the respective MU-MIMO group and performs an RTS-CTS sequence with each of those STAs. For example, RTS1 is sent to selected STA1, which in turn sends CTS1 to AP1 105-a. Similarly, RTS2 is sent to selected STA2, which in turn sends CTS2 to AP1 105-a. After hearing the CTSs, other STAs and OBSS APs would set their network allocation vector (NAV) for the appropriate duration of the MU-MIMO sounding sequence. The MU-MIMO sounding sequence is then performed with the MU-MIMO group to subsequently transmit MU-MIMO data transmission to the STAs in the MU-MIMO group. The MU-MIMO sounding sequence is protected because of the NAV setting in the other STAs and OBSS APs.

Figure 4:
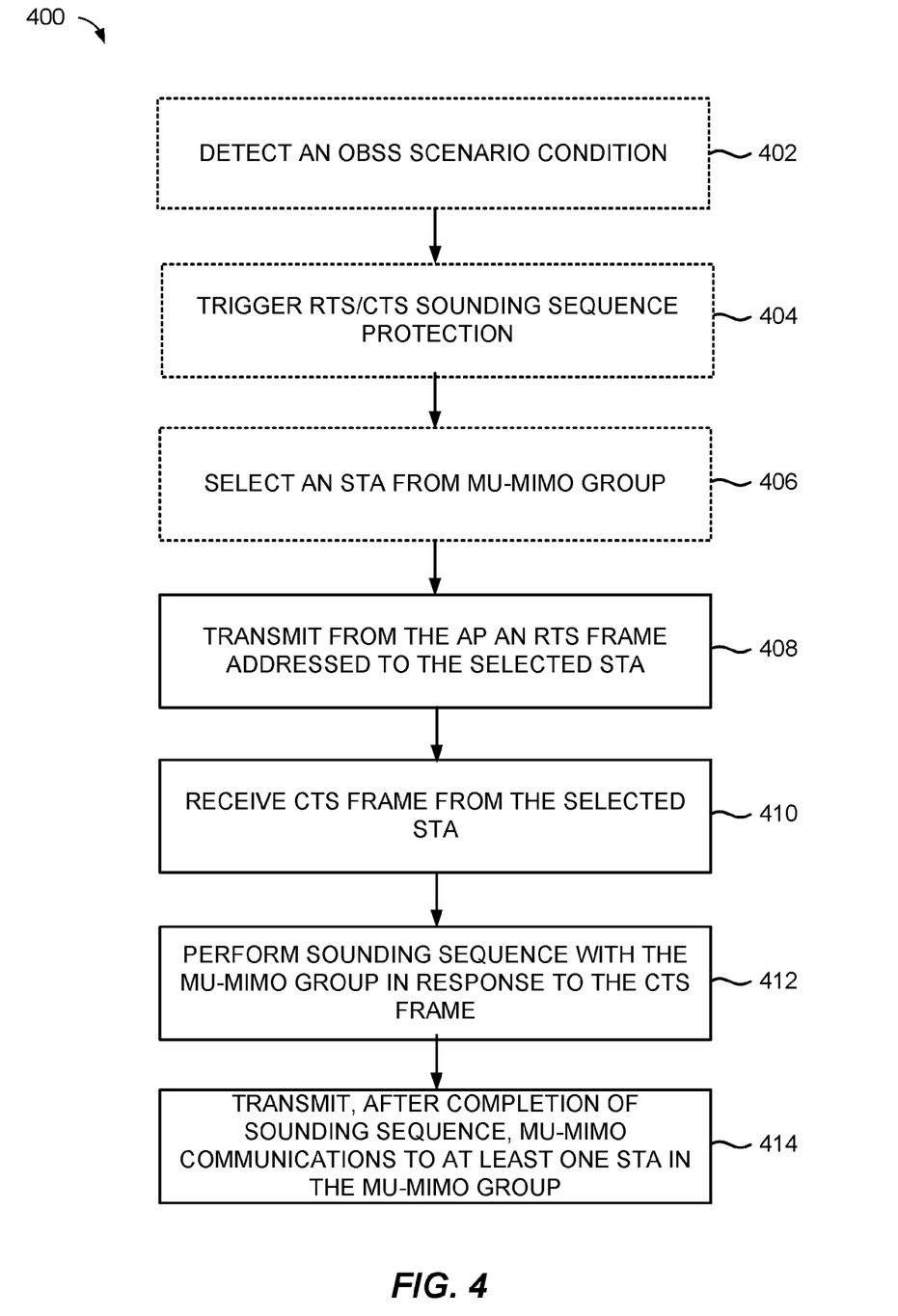
FIG. 4 is a flow diagram illustrating an example of a method for MU-MIMO sounding sequence protection using a single RTS-CTS sequence for a selected wireless station of an MU-MIMO group in accordance with various aspects of the present disclosure.
Figure 5:
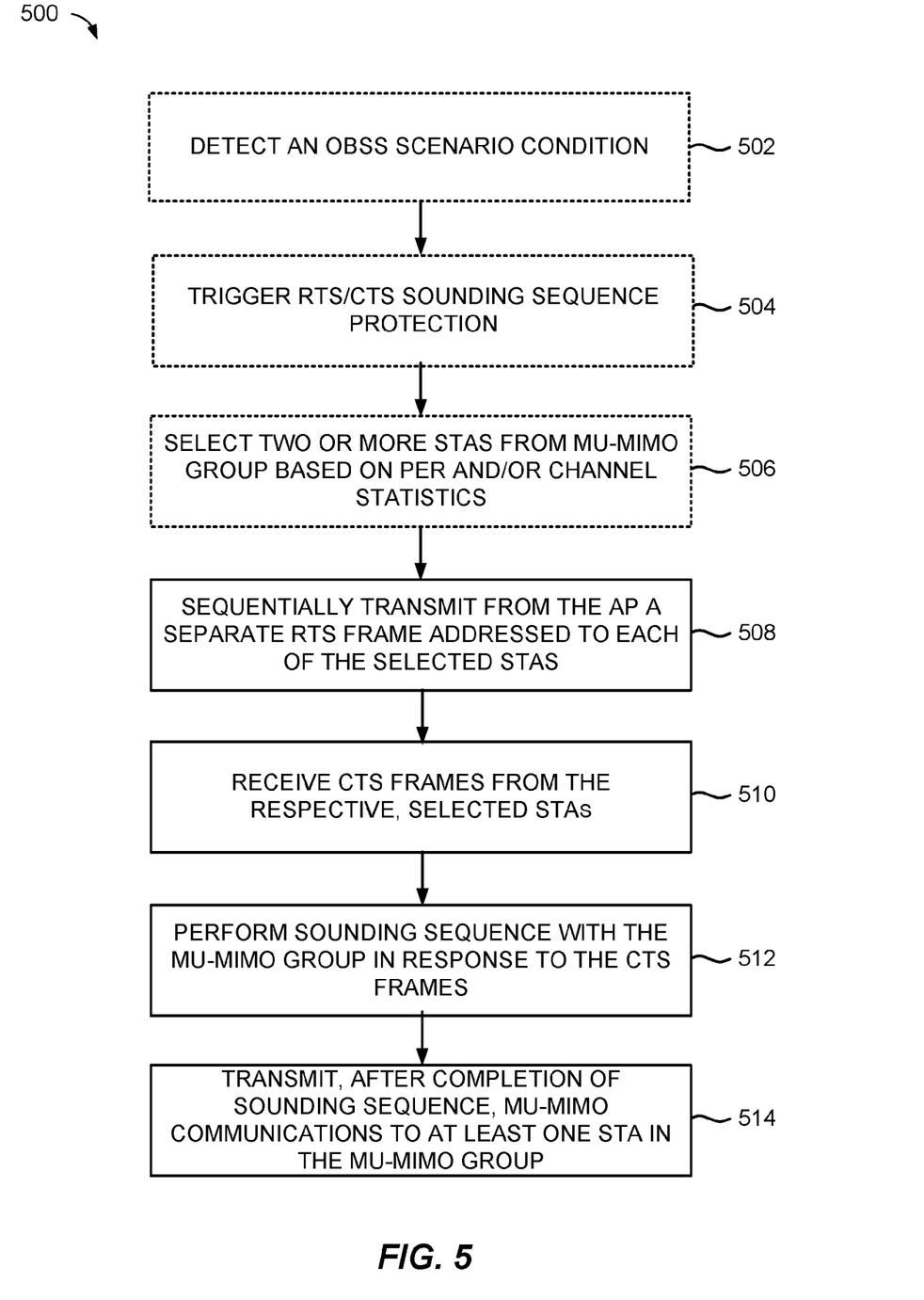
FIG. 5 is a flow diagram illustrating an example of a method for MU-MIMO sounding sequence protection using multiple RTS-CTS sequences for selected wireless stations of an MU-MIMO group in accordance with various aspects of the present disclosure.
Figure 6:
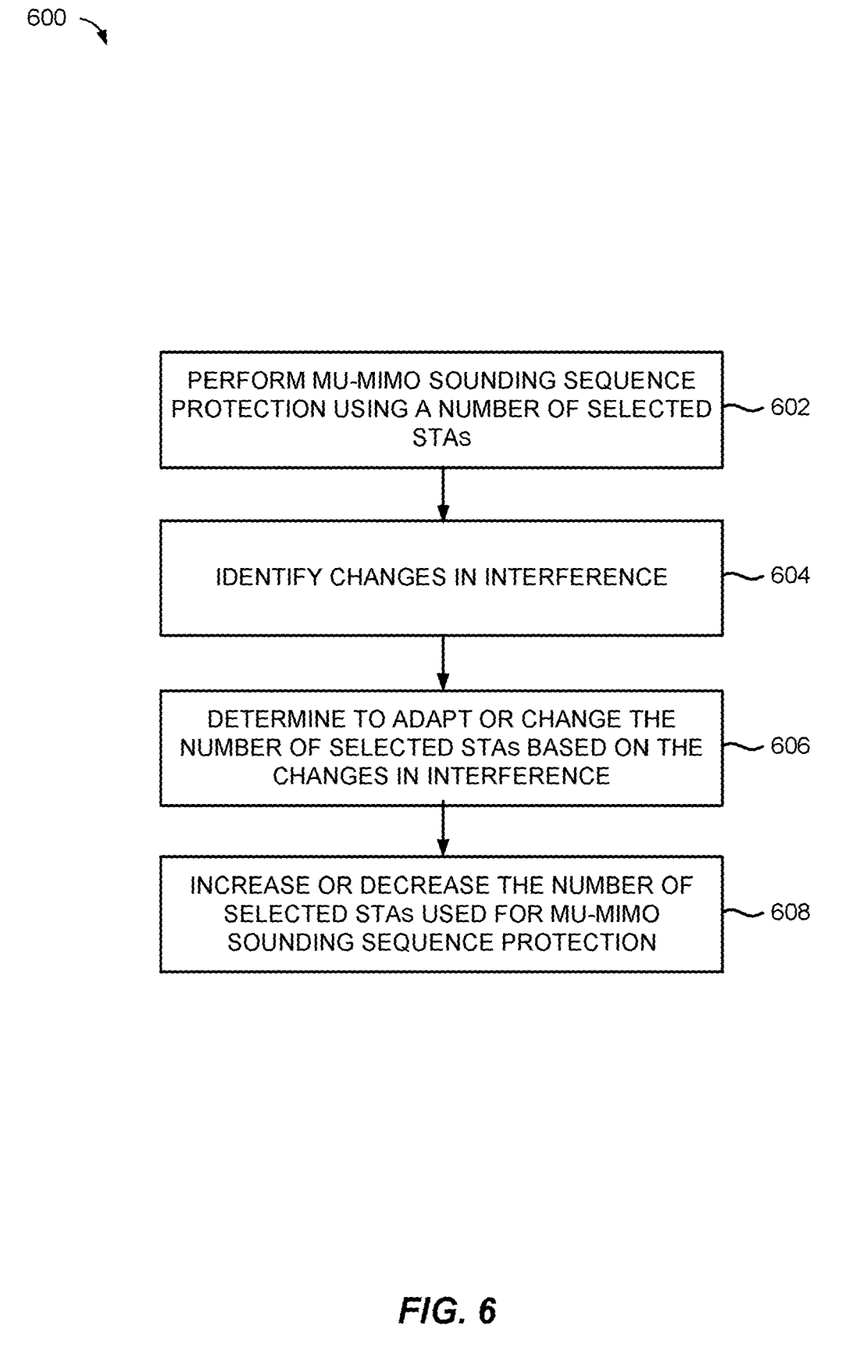
FIG. 6 is a flow diagram illustrating an example of a method for dynamically adapting a number of selected wireless stations used for MU-MIMO sounding sequence protection in accordance with various aspects of the present disclosure.

Referring to FIGS. 4-6, examples of one or more operations related to the sounding sequence protection component 220 (FIG. 2) according to the present apparatus and methods are described with reference to one or more methods and one or more components. Although the operations described below are presented in a particular order and/or as being performed by an example component, it should be understood that the ordering of the actions and the components performing the actions may be varied, depending on the implementation. Also, although the sounding sequence protection component 220 is illustrated as having a number of subcomponents, it should be understood that one or more of the illustrated subcomponent may be separate from, but in communication with, the sounding sequence protection component 220 and/or each other. Moreover, it should be understood that the following actions or components described with respect to the sounding sequence protection component 220 and/or its subcomponents may be performed by a specially-programmed processor, a processor executing specially-programmed software or computer-readable media, or by any other combination of a hardware component and/or a software component specially configured for performing the described actions or components. For example, various aspects of the operation of the sounding sequence protection component 220 and/or its subcomponents may be performed by, or implemented in, the processor 203 in FIG. 2.

Referring to FIG. 4, a flow diagram is shown illustrating a method 400 in connection with the techniques described in FIG. 3A, the method 400 includes, at block 402, optionally detecting an OBSS scenario condition. In an aspect, the sounding sequence protection component 220, the trigger component 240, the condition detection component 242, and/or the processor 203 may detect or identify a condition that indicates an OBSS or similar interference scenario.

At block 404, the method 400 may optionally include triggering or initiation of the use of RTS-CTS sounding sequence protection (e.g., using an RTS-CTS sequence for MU-MIMO sounding sequence protection) in response to detection of the condition in block 402. In an aspect, the sounding sequence protection component 220, the trigger component 240, and/or the processor 203 may trigger or initiate RTS-CTS sounding sequence protection in response to the detection on the OBSS condition.

At block 406, the method 400 may optionally include selecting an intended STA from an MU-MIMO group for the RTS-CTS sequence used in connection with the RTS-CTS sounding sequence protection. In an aspect, the sounding sequence protection component 220, the protection component 246, the STA selection component 248, and/or the processor 203 may select the intended STA.

At block 408, the method 400 may include transmitting, from an AP, an RTS frame, where the RTS frame is addressed to the STA selected from the MU-MIMO group in block 406. In an aspect, the sounding sequence protection component 220, the protection component 246, the RTS-CTS sequence component 254, the processor 203, and/or the transceiver 206 may generate and transmit the RTS frame to the selected STA.

At block 410, the method 400 may include receiving, at the access point, a CTS frame from the selected STA. In an aspect, the sounding sequence protection component 220, the protection component 246, the RTS-CTS sequence component 254, the processor 203, and/or the transceiver 206 may receive and process the CTS frame from the selected STA.

At block 412, the method 400 may include performing, in response to receiving the CTS frame, an MU-MIMO sounding sequence with the MU-MIMO group. In an aspect, the sounding sequence protection component 220, the sounding sequence component 256, the processor 203, and/or the transceiver 206 may perform the MU-MIMO sounding sequence.

At block 414, the method 400 may include transmitting, after completion of the MU-MIMO sounding sequence, MU-MIMO data communications to at least one of the STAs in the MU-MIMO group. In an aspect, the processor 203 and/or the transceiver 206 may perform the MU-MIMO data communications, including data transmission and data reception, with STAs in the MU-MIMO group.

In another aspect of method 400, the selected STA may be randomly selected from a plurality of STAs in the MU-MIMO group. In yet another aspect, the selected STA may be selected based on a round robin scheme, as a first STA in the MU-MIMO sounding sequence configured to send back a CBF in response to an NDP of the MU-MIMO sounding sequence, or based on a token assignment and decrement scheme. The token assignment and decrement scheme may include assigning a token to each STA in the MU-MIMO group, and decrementing the token for the STA to which the RTS frame is transmitted. The token assignment and decrement scheme may include assigning a first number of tokens to a first STA in the MU-MIMO group, and assigning a second number of tokens to a second STA in the MU-MIMO group, where the first number of tokens is greater than the second number of tokens, and where a number of sounding sequence failures associated with the first STA is greater than a number of sounding sequence failures associated with the second STA. The token assignment and decrement schemes may be performed by, for example, the token scheme 250 in the STA selection component 248.

In another aspect of method 400, a duration of the RTS frame may be configured to cover, for example, a duration of the CTS frame, an NDPA, and an NDP. In another example, a duration of the RTS frame may be configured to cover a duration of the CTS frame and a duration of the sounding sequence.

In yet another aspect of method 400, a duration of the CTS frame may be configured to cover the CTS frame, the duration of the complete MU-MIMO sounding sequence, and the duration of the complete subsequent MU PPDU transmission.

In another aspect of method 400, a duration of the CTS frame may be configured to cover, for example, a duration of an NDPA and an NDP. In another example, a duration of the CTS frame may be configured to cover a duration of the sounding sequence.

In yet another aspect of method 400, a duration of the CTS frame may be configured to cover the duration of the complete MU-MIMO sounding sequence plus the duration of the complete subsequent MU PPDU transmission.

In yet another aspect of method 400, detecting the condition may include identifying a condition indicating a need for RTS-CTS sequence protection of the MU-MIMO sounding sequence, and triggering the transmission of the RTS frame in response to identifying the condition. The condition may be one or more of a register setting (e.g., register 244), detection of an OBSS, a periodic or otherwise scheduled measurement of system throughput to determine whether RTS-CTS sequence protection enhances system throughout, or whether a number of sounding sequence failures satisfies a threshold over a specified period of time.

In yet another aspect of method 400, selecting more than one STA may include dynamically adapting (e.g., changing over time) a number of selected STAs. That is, which STAs and/or the number of STAs that are selected may vary over time.

Referring to FIG. 5, a flow diagram is shown illustrating a method 500 in connection with the techniques described in FIG. 3B, the method 500 includes, at block 502, optionally detecting an OBSS scenario condition. In an aspect, the sounding sequence protection component 220, the trigger component 240, the condition detection component 242, and/or the processor 203 may detect or identify a condition that indicates an OBSS or similar interference scenario.

At block 504, the method 500 may optionally include triggering or initiation of the use of RTS-CTS sounding sequence protection (e.g., using an RTS-CTS sequence for MU-MIMO sounding sequence protection) in response to detection of the condition in block 502. In an aspect, the sounding sequence protection component 220, the trigger component 240, and/or the processor 203 may trigger or initiate RTS-CTS sounding sequence protection in response to the detection on the OBSS condition.

At block 506, the method 500 may optionally include selecting two or more intended STAs from an MU-MIMO group for the RTS-CTS sequence used in connection with the RTS-CTS sounding sequence protection. The two or more intended STAs may be selected based on PER and/or channel statistics. In an aspect, the sounding sequence protection component 220, the protection component 246, the STA selection component 248, the PER/channel statistics 252, and/or the processor 203 may select the intended STAs.

At block 508, the method 500 may include sequentially transmitting, from an AP, a separate RTS frame to each of the selected STAs (e.g., RTS1 to selected STA1 and RTS2 to selected STA2 as shown in FIG. 3B), where each RTS frame is addressed to the respective STA selected from the MU-MIMO group in block 506. In an aspect, the sounding sequence protection component 220, the protection component 246, the RTS-CTS sequence component 254, the processor 203, and/or the transceiver 206 may generate and transmit the RTS frame to the selected STA.

At block 510, the method 500 may include receiving, at the access point, a CTS frame from each of the respective, selected STAs. In an aspect, the sounding sequence protection component 220, the protection component 246, the RTS-CTS sequence component 254, the processor 203, and/or the transceiver 206 may receive and process the CTS frames from the selected STAs.

At block 512, the method 500 may include performing, in response to receiving the CTS frames, an MU-MIMO sounding sequence with the MU-MIMO group. In an aspect, the sounding sequence protection component 220, the sounding sequence component 256, the processor 203, and/or the transceiver 206 may perform the MU-MIMO sounding sequence.

At block 514, the method 500 may include transmitting, after completion of the MU-MIMO sounding sequence, MU-MIMO data communications to at least one of the STAs in the MU-MIMO group. In an aspect, the processor 203 and/or the transceiver 206 may perform the MU-MIMO data communications, including data transmission and data reception, with STAs in the MU-MIMO group.

FIG. 6 is a flow diagram illustrating an example of a method 600 for dynamically adapting a number of selected STAs used for MU-MIMO sounding sequence protection in accordance with various aspects of the present disclosure. At block 602, an AP, such as the AP1 105-a in FIG. 2, may perform MU-MIMO sounding sequence protection using a number (N) of STAs in connection with an RTS-CTS sequence used for the protection. In an aspect, the sounding sequence protection component 220 and/or the processor 203 may perform the RTS-CTS sequence protection using N STAs.

At block 604, the AP may identify changes in interference (e.g., changes in the level of interference) such as changes in PER and/or collision statistics. These changes may be identified by the sounding sequence protection component 220, the protection component 246, the STA selection component 248, and/or the processor 203, for example.

At block 606, the AP may determine to adapt or change the current number (N) of STAs based on the changes in interference. For example, the AP may determine that there has been an increase in the level of interference and may determine that a greater number (>N) of STAs may be needed than the current number to provide RTS-CTS sequence protection to the MU-MIMO sounding sequence. Because failures from RTS-CTS sequence collisions have a lesser effect on system throughput that MU-MIMO sounding sequence failures, the additional overhead caused by using a greater number of STAs in RTS-CTS sequence protection may be offset by the reduction of MU-MIMO sounding sequence failures.

In another example, the AP may determine that there has been a decrease or reduction in the level of interference and may determine that a smaller number (<N) of STAs may be needed than the current number to provide RTS-CTS sequence protection to the MU-MIMO sounding sequence.

The adaptation or change described in connection with block 606 may be dynamic and may occur in response to time-varying changes in the level of interference.

At block 608, the AP may increase or decrease the number (N) of STAs used for MU-MIMO sounding sequence protection in accordance with the determination in block 606. The increase or decrease may be step-wise, for example, the number of STAs may increase by one or decrease by one when a determination is made that the number of STAs is to be changed. Once adapted, the current number of STAs may remain the same for a pre-determined amount of time or until a next determination is made to adapt or change the current number of STAs in view of changes in the level of interference.

The dynamic adaptation or change in the number of STAs may be determined and/or performed by the sounding sequence protection component 220, the protection component 246, the STA selection component 248, and/or the processor 203, for example.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An access point for wireless communications, comprising:
    a transceiver;
    a memory; and
    a processor communicatively coupled to the transceiver and the memory, the processor being configured to:
        detect a condition that triggers a protection of a sounding sequence for multiple-input-multiple-output (MU-MIMO) data communications of an MU-MIMO group;
        select in response to the triggering of the protection of the sounding sequence, a single wireless station (STA) from a plurality of STAs in the MU-MIMO group as an intended STA for the protection of the sounding sequence, the selected STA being selected based on one of several different selection criteria;
        transmit, via the transceiver and as part of the protection of the sounding sequence, a single request-to-send (RTS) frame for the plurality of STAs in the MU-MIMO group, the single RTS frame being addressed only to the selected STA;
        receive, via the transceiver and from the selected STA as part of the sounding sequence protection, a single clear-to-send (CTS) frame for the plurality of STAs in the MU-MIMO group;
        perform, in response to receiving the single CTS frame from the selected STA, the sounding sequence in which the plurality of STAs in the MU-MIMO group participate; and
        transmit, via the transceiver and after completion of the sounding sequence, the MU-MIMO data communications to at least one of the plurality of STAs in the MU-MIMO group.

2. The access point of claim 1, wherein for the one of the several different selection criteria, the processor is configured to randomly select the selected STA from the plurality of STAs in the MU-MIMO group.

3. The access point of claim 1, wherein for the one of the several different selection criteria, the processor is configured to select the selected STA from the plurality of STAs in the MU-MIMO group based on a round robin scheme.

4. The access point of claim 1, wherein for the one of the several different selection criteria, the processor is configured to select as the selected STA a first STA in the sounding sequence configured to send back a compressed beamforming feedback (CBF) in response to a null data packet (NDP) of the sounding sequence.

5. The access point of claim 1, wherein for the one of the several different selection criteria, the processor is configured to select the selected STA from the plurality of STAs in the MU-MIMO group based on a token assignment and decrement scheme.

6. The access point of claim 5, wherein the processor is configured to perform the token assignment and decrement scheme by being configured to:
    assign a token to each STA in the plurality of STAs in the MU-MIMO group; and
    decrement the token for the STA to which the RTS frame is transmitted.

7. The access point of claim 5, wherein processor is configured to perform the token assignment and decrement scheme by being configured to:
    assign a first number of tokens to a first STA from the plurality of STAs in the MU-MIMO group; and
    assign a second number of tokens to a second STA from the plurality of STAs in the MU-MIMO group,
        wherein the first number of tokens is greater than the second number of tokens, and
        wherein a number of sounding sequence failures associated with the first STA is greater than a number of sounding sequence failures associated with the second STA.

8. The access point of claim 1, wherein a duration of the single RTS frame is configured to cover a duration of the single CTS frame, a null data packet announcement (NDPA), and an NDP.

9. The access point of claim 1, wherein a duration of the single RTS frame is configured to cover a duration of the single CTS frame and a duration of the sounding sequence.

10. The access point of claim 1, wherein a duration of the single RTS frame is configured to cover a duration of the single CTS frame, a duration of the sounding sequence, and a duration of an MU PLCP protocol data unit (PPDU) transmission.

11. The access point of claim 1, wherein a duration of the single CTS frame is configured to cover a duration of an NDPA and an NDP.

12. The access point of claim 1, wherein a duration of the single CTS frame is configured to cover a duration of the sounding sequence.

13. The access point of claim 1, wherein a duration of the single CTS frame is configured to cover a duration of the sounding sequence and a duration of an MU PPDU transmission.

14. The access point of claim 1, wherein the condition is one or more of:
    a register setting;
    a detection of an overlapping basic service set (OBSS);
    a periodic measurement to determine whether RTS-CTS sequence protection enhances throughout; or
    a number of sounding sequence failures satisfies a threshold over a specified period of time.

15. The access point of claim 1, wherein the processor is further configured to:
    select as part of the protection of the sounding sequence, in addition to the selected STA, one or more STAs from the plurality of STAs in the MU-MIMO group based on one or both of packet error rate (PER) or collision statistics, the selected one or more STAs and the selected STA being less than the plurality of STAs in the MU-MIMO group, transmit as part of the protection of the sounding sequence, via the transceiver and in addition to the single RTS frame, a single RTS frame to each of the selected one or more STAs, the RTS frames being transmitted for the plurality of STAs in the MU-MIMO group, and each additional single RTS frame being addressed only to a respective one of the selected one or more STAs, receive as part of the protection of the sounding sequence, via the transceiver and in addition to the single CTS frame, a single CTS frame from each of the selected one or more STAs, the CTS frames being received for the plurality of STAs in the MU-MIMO group, and perform, in response to receiving the single CTS frame from the selected STA and the additional single CTS frame from each of the selected one or more STAs, the sounding sequence with the MU-MIMO group having the plurality of STAs.

16. The access point of claim 15, wherein the processor is further configured to dynamically increase or decrease a number of STAs that are selected for the selected one or more STAs and the selected STA.

17. The access point of claim 1, wherein the single RTS frame is compatible with STAs that support IEEE 802.11ax or versions of IEEE 802.11 that are earlier versions than IEEE 802.11ax.

18. A method for wireless communications, comprising:
detecting a condition that triggers a protection of a sounding sequence for multiple-input-multiple-output (MU-MIMO) data communications of an MU-MIMO group;
selecting in response to the triggering of the protection of the sounding sequence, a single wireless station (STA) from a plurality of STAs in the MU-MIMO group as an intended STA for the protection of the sounding sequence, the selected STA being selected based on one of several different selection criteria;
transmitting, from an access point and as part of the protection of the sounding sequence, a single request-to-send (RTS) frame for the plurality of STAs in the MU-MIMO group, the single RTS frame being addressed only to the selected STA;
receiving, at the access point and from the selected STA as part of the protection of the sounding sequence, a single clear-to-send (CTS) frame for the plurality of STAs in the MU-MIMO group;
performing, in response to receiving the single CTS frame from the selected STA, the sounding sequence in which the plurality of STAs in the MU-MIMO group participate; and
transmitting, after completion of the sounding sequence, the MU-MIMO data communications to at least one of the plurality of STAs in the MU-MIMO group.

19. The method of claim 18, wherein selecting the single STA from the plurality of STAs in the MU-MIMO group based on the one of the several different selection criteria comprises selecting a first STA in the sounding sequence configured to send back a compressed beam-forming feedback (CBF) in response to a null data packet (NDP) of the sounding sequence.

20. The method of claim 18, wherein selecting the single STA from the plurality of STAs in the MU-MIMO group based on the one of the several different selection criteria comprises selecting the single STA based on a token assignment and decrement scheme.

21. The method of claim 20, wherein the token assignment and decrement scheme comprises:
assigning a token to each STA in the plurality of STAs in the MU-MIMO group; and
decrementing the token for the STA to which the single RTS frame is transmitted.

22. The method of claim 20, wherein the token assignment and decrement scheme comprises:
assigning a first number of tokens to a first STA from the plurality of STAs in the MU-MIMO group; and
assigning a second number of tokens to a second STA from the plurality of STAs in the MU-MIMO group,
wherein the first number of tokens is greater than the second number of tokens, and
wherein a number of sounding sequence failures associated with the first STA is greater than a number of sounding sequence failures associated with the second STA.

23. The method of claim 18, wherein a duration of the single RTS frame is configured to cover a duration of the single CTS frame, a null data packet announcement (NDPA), and an NDP.

24. The method of claim 18, wherein a duration of the single RTS frame is configured to cover a duration of the single CTS frame and a duration of the sounding sequence.

25. The method of claim 18, wherein a duration of the single RTS frame is configured to cover a duration of the single CTS frame, a duration of the sounding sequence, and a duration of an MU PLCP protocol data unit (PPDU) transmission.

26. The method of claim 18, wherein a duration of the single CTS frame is configured to cover a duration of an NDPA and an NDP.

27. The method of claim 18, wherein a duration of the single CTS frame is configured to cover a duration of the sounding sequence, or the duration of the sounding sequence and a duration of an MU PPDU transmission.

28. The method of claim 18,
wherein the condition is one or more of:
a register setting;
a detection of an overlapping basic service set (OBSS);
a periodic measurement to determine whether RTS-CTS sequence protection enhances throughout; or
a number of sounding sequence failures satisfies a threshold over a specified period of time.

29. The method of claim 18, further comprising:
selecting as part of the protection of the sounding sequence, in addition to the selected STA, one or more STAs from the plurality of STAs in the MU-MIMO group based on one or both of packet error rate (PER) or collision statistics, the selected one or more STAs and the selected STA being less than the plurality of STAs in the MU-MIMO group, wherein:
transmitting the single RTS frame as part of the protection of the sounding sequence further comprises transmitting a single RTS frame to each of the selected one or more STAs, the RTS frames being transmitted for the plurality of STAs in the MU-MIMO group, and each additional single RTS frame being addressed only to a respective one of the selected one or more STAs,
receiving the single CTS frame as part of the protection of the sounding sequence further comprises receiving a single CTS frame from each of the selected one or more STAs, the CTS frames being received for the plurality of STAs in the MU-MIMO group, and performing the sounding sequence is in response to receiving the single CTS frame from the selected STA and the additional single CTS frame from each of the one or more STAs.

30. An access point for wireless communications, comprising:

means for detecting a condition that triggers a protection of a sounding sequence for multiple-input-multiple-output (MU-MIMO) data communications of an MU-MIMO group;

means for selecting in response to the triggering of the protection of the sounding sequence, a single wireless station (STA) from a plurality of STAs in the MU-MIMO group as an intended STA for the protection of the sounding sequence, the selected STA being selected based on one of several different selection criteria;

means for transmitting as part of the protection of the sounding sequence a single request-to-send (RTS) frame for the plurality of STAs in the MU-MIMO group, the single RTS frame being addressed only to the selected STA;

means for receiving, from the selected STA and as part of the protection of the sounding sequence, a single clear-to-send (CTS) frame for the plurality of STAs in the MU-MIMO group;

means for performing, in response to receiving the single CTS frame from the selected STA, the sounding sequence in which the plurality of STAs in the MU-MIMO group participate; and means for transmitting, after completion of the sounding sequence, the MU-MIMO data communications to at least one of the plurality of STAs in the MU-MIMO group.

31. A non-transitory computer-readable medium storing computer executable code for wireless communications, the code comprising:

code for detecting a condition that triggers a protection of a sounding sequence for multiple-input-multiple-output (MU-MIMO) data communications of an MU-MIMO group;

code for selecting in response to the triggering of the protection of the sounding sequence, a single wireless station (STA) from a plurality of STAs in the MU-MIMO group, the selected STA being selected based on one of several different selection criteria;

code for transmitting as part of the protection of the sounding sequence a single request-to-send (RTS) frame for the plurality of STAs in the MU-MIMO group, the RTS frame being addressed only to selected STA;

code for receiving, from the selected STA and as part of the protection of the sounding sequence, a single clear-to-send (CTS) frame for the plurality of STAs in the MU-MIMO group;

code for performing, in response to receiving the single CTS frame from the selected STA, the sounding sequence in which the plurality of STAs in the MU-MIMO group participate; and code for transmitting, after completion of the sounding sequence, the MU-MIMO data communications to at least one of the plurality of STAs in the MU-MIMO group.

* * * * *